United States Patent
Johnson et al.

(10) Patent No.: US 10,699,565 B2
(45) Date of Patent: Jun. 30, 2020

(54) SYSTEMS AND METHODS FOR INFERRING LANE OBSTRUCTIONS

(71) Applicant: Toyota Motor Engineering & Manufacturing North America, Inc., Plano, TX (US)

(72) Inventors: Miles J. Johnson, Ann Arbor, MI (US); Christopher J. Smalley, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 16/204,578

(22) Filed: Nov. 29, 2018

(65) Prior Publication Data

US 2019/0311613 A1    Oct. 10, 2019

Related U.S. Application Data

(60) Provisional application No. 62/652,357, filed on Apr. 4, 2018.

(51) Int. Cl.
 *G08G 1/01* (2006.01)
(52) U.S. Cl.
 CPC ......... *G08G 1/0141* (2013.01); *G08G 1/0112* (2013.01); *G08G 1/0133* (2013.01)
(58) Field of Classification Search
 CPC ... G08G 1/0141; G08G 1/0112; G08G 1/0133
 See application file for complete search history.

(56) References Cited

U.S. PATENT DOCUMENTS

| | | | |
|---|---|---|---|
| 9,045,041 | B2 | 6/2015 | Dorum et al. |
| 9,240,082 | B2 | 1/2016 | Marathe et al. |
| 9,633,564 | B2 | 4/2017 | Ferguson |
| 9,804,601 | B2 | 10/2017 | Lombrozo et al. |
| 9,953,535 | B1 | 4/2018 | Canavor et al. |
| 2013/0054050 | A1 | 2/2013 | Filev et al. |
| 2013/0338914 | A1 | 12/2013 | Weiss |
| 2014/0062725 | A1 | 3/2014 | Maston |
| 2015/0117723 | A1 | 4/2015 | Joshi et al. |
| 2016/0042644 | A1 | 2/2016 | Velusamy |
| 2016/0102986 | A1 | 4/2016 | Ma et al. |
| 2016/0133131 | A1 | 5/2016 | Grimm et al. |
| 2016/0363935 | A1 | 12/2016 | Shuster et al. |

(Continued)

OTHER PUBLICATIONS

U.S. Appl. No. 16/033,281, filed Jul. 18, 2018.

*Primary Examiner* — Adam M Alharbi
(74) *Attorney, Agent, or Firm* — Christopher G. Darrow; Darrow Mustafa PC

(57) ABSTRACT

System, methods, and other embodiments described herein relate to identifying lane obstructions. In one embodiment, a method includes collecting, in an electronic data store, position data of surrounding vehicles observed by reporting vehicles that travel over a roadway segment. The method includes analyzing the position data to identify whether observed positions correlate with an obstruction pattern that is indicative of a lane obstruction in at least one lane of the roadway segment. The method includes, in response to determining the position data indicates the lane obstruction, providing a signal identifying the lane obstruction to oncoming vehicles of the roadway segment.

20 Claims, 8 Drawing Sheets

(56) References Cited

U.S. PATENT DOCUMENTS

2017/0115633 A1    4/2017  Nordbruch
2017/0287233 A1*  10/2017  Nix ........................ G07C 5/008
2017/0316333 A1   11/2017  Levinson et al.
2018/0047285 A1    2/2018  Johnson
2018/0164825 A1*   6/2018  Matus .................. G05D 1/0214

* cited by examiner

SYSTEMS AND METHODS FOR INFERRING LANE OBSTRUCTIONS

CROSS-REFERENCE TO RELATED APPLICATIONS

This application claims benefit of U.S. Provisional Application No. 62/652,357, filed on, Apr. 4, 2018, which is herein incorporated by reference in its entirety.

TECHNICAL FIELD

The subject matter described herein relates, in general, to identifying lane obstructions, and, more particularly, to using observations of surrounding vehicles to infer the presence of lane obstructions.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as autonomous driving systems can perceive the noted aspects and accurately plan and navigate accordingly.

In general, the further awareness is developed by the vehicle about a surrounding environment, the better a driver can be supplemented with information to assist in driving and/or the better an autonomous system can control the vehicle to avoid hazards. However, the sensor data is generally limited to direct observations. That is, the sensor data cannot provide information about aspects of the surrounding environment that are not directly observed. As such, the vehicle may be unaware of various latent aspects of the environment thereby increasing risks in relation to those aspects.

Moreover, occurrences of events within roadways that block lanes or otherwise cause a lane to become impassable represent difficulties when traveling along a road. These lane obstructions result in delays and/or potentially hazardous circumstances to navigate. However, existing approaches to identifying such occurrences generally rely on manual reporting and/or direct observations of the obstructions by a vehicle, which can be complicated by obstructed views and other limitations. Consequently, present approaches fail to detect roadway obstructions or provide sufficient notice about the obstructions thereby increasing risks and the ability to safely navigate the obstructions.

SUMMARY

In one embodiment, example systems and methods relate to a manner of improving lane obstruction detection by aggregating observations from reporting vehicles about positions of surrounding vehicles along a roadway segment. As previously noted, direct observations and manual reporting to identify lane obstructions is generally insufficient to provide adequate information about such aspects of a roadway. Thus, in one embodiment, the disclosed system leverages inferences about movements of surrounding vehicles in addition to the information about reporting vehicles to further inform the identification of lane obstructions. For example, as provided for herein, the reporting vehicles provide information about not only their location but also position data about surrounding vehicles identified by the reporting vehicles.

By way of illustration, the reporting vehicle is generally aware of a location on a roadway segment when traveling as identified by, for example, a GPS or other location determining sensor (e.g., LiDAR via localization against a feature map). While this information can be reported individually, such observations provide a narrow perspective about potential lane obstructions because the individual observations relate to positions/movements of a single vehicle within a single lane. Thus, the reporting vehicle further leverages onboard systems to, for example, identify surrounding vehicles and observe positions of the surrounding vehicles. Accordingly, the reporting vehicle multiplies the observing power by leveraging observations of the plurality of vehicles around the reporting vehicle. As such, the reporting vehicle is then capable of reporting position data about the reporting vehicle itself along with the surrounding vehicles in order to provide a more comprehensive view of the traffic patterns on the roadway segment.

Consequently, as the reporting vehicle travels along the roadway segment, the reporting vehicle communicates the position data about the vehicles to an aggregation point such as a cloud-computing system (e.g., lane obstruction system). The noted system can then analyze the aggregated information to identify patterns embodied therein that are indicative of obstructions within one or more lanes. From these identifications, the system, in one aspect, communicates warnings to oncoming vehicles in order to convey the identified lane obstructions to vehicles that are about to traverse the roadway segment. In this way, the disclosed system leverages observations from many different vehicles to infer the presence of obstructions within lanes and to thereby improve the detection of lane obstructions without using direct observations of the obstruction itself.

In one embodiment, a lane obstruction system for identifying lane obstructions is disclosed. The lane obstruction system includes one or more processors and a memory communicably coupled to the one or more processors. The memory stores an acquisition module including instructions that when executed by the one or more processors cause the one or more processors to collect, in an electronic data store, position data of surrounding vehicles observed by reporting vehicles that travel over a roadway segment. The memory stores an obstruction module including instructions that when executed by the one or more processors cause the one or more processors to analyze the position data to identify whether observed positions correlate with an obstruction pattern that is indicative of a lane obstruction in at least one lane of the roadway segment. The obstruction module further includes instructions to, in response to determining the position data indicates the lane obstruction, provide a signal identifying the lane obstruction to oncoming vehicles of the roadway segment.

In one embodiment, a non-transitory computer-readable medium for identifying lane obstructions and including instructions that when executed by one or more processors cause the one or more processors to perform one or more functions is disclosed. The instructions include instructions to collect, in an electronic data store, position data of surrounding vehicles observed by reporting vehicles that travel over a roadway segment. The instructions include instructions to analyze the position data to identify whether observed positions correlate with an obstruction pattern that is indicative of a lane obstruction in at least one lane of the roadway segment. The instructions include instructions to, in response to determining the position data indicates the lane obstruction, provide a signal identifying the lane obstruction to oncoming vehicles of the roadway segment.

In one embodiment, a method for identifying lane obstructions is disclosed. In one embodiment, the method includes collecting, in an electronic data store, position data of surrounding vehicles observed by reporting vehicles that travel over a roadway segment. The method includes analyzing the position data to identify whether observed positions correlate with an obstruction pattern that is indicative of a lane obstruction in at least one lane of the roadway segment. The method includes, in response to determining the position data indicates the lane obstruction, providing a signal identifying the lane obstruction to oncoming vehicles of the roadway segment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
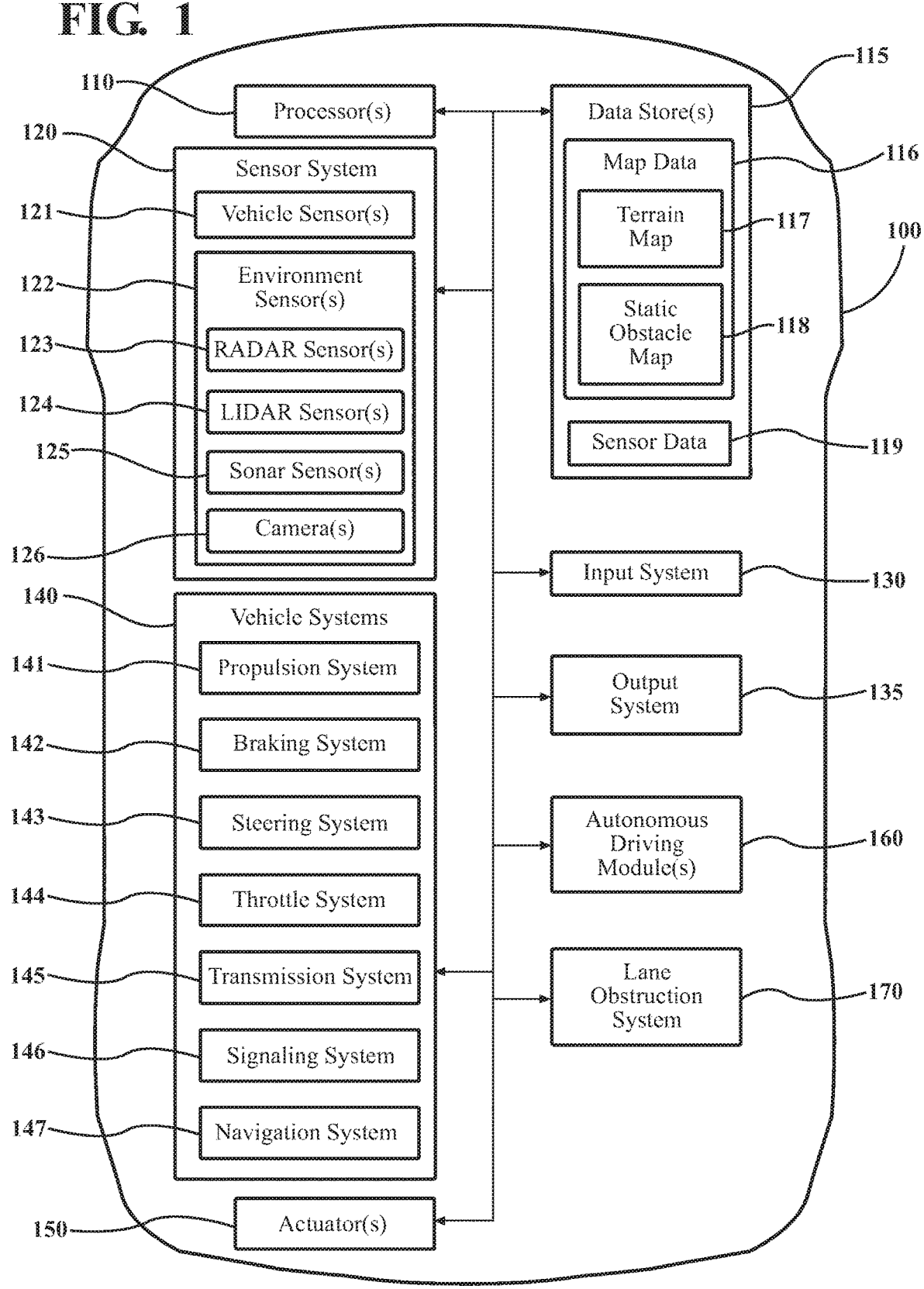
FIG. 1 illustrates one embodiment of a vehicle within which systems and methods disclosed herein may be implemented.

Systems, methods, and other embodiments associated with improving identification of lane obstructions through aggregating observations vehicles surrounding reporting vehicles along a roadway segment. Because direct observations and manual reporting of lane obstructions generally fails to provide for adequate identification of hazards that can inhibit traffic flow, the presently disclosed lane obstruction system expands on the information acquired and used in the detection process to improve lane obstruction detection overall. Thus, in one embodiment, the disclosed system leverages a network of reporting vehicles to collect information about traffic movement along roadway segments. For example, as provided for herein, the reporting vehicles provide information about not only a location and movements of the reporting vehicles but also position data (e.g., relative location and movement) about surrounding vehicles identified by the reporting vehicles.

That is, in one approach, as a reporting vehicle travels along a roadway segment, the reporting vehicle is generally aware of a location on the roadway segment as identified by, for example, a GPS or other location determining sensor/approach (e.g., feature-based localization). The reporting vehicle further leverages onboard systems (e.g., autonomous or semi-autonomous systems) to, for example, identify surrounding vehicles and observe positions of the surrounding vehicles. Accordingly, the reporting vehicle reports about locations of multiple separate vehicles within a roadway segment instead of providing only singular information about the reporting vehicle itself. As such, the reporting vehicle provides position data about the reporting vehicle along with position data about the surrounding vehicles in order to provide a fuller view of the traffic patterns on the roadway segment and improve knowledge about traffic when attempting to identify lane obstructions.

Consequently, as the reporting vehicle travels along the roadway segment, the reporting vehicle communicates the position data about the vehicles to an aggregation point such as a cloud-computing system (e.g., lane obstruction system). The noted system then analyzes the aggregated information to identify patterns embodied therein that are indicative of obstructions within one or more lanes. That is, because vehicles generally slow down, swerve, and otherwise drive in a manner so as to avoid lane obstructions, such obstructions are generally observable in vehicle positions over time and especially between separate vehicles that exhibit similar paths along the same roadway segment.

Accordingly, analyzing the position data over a sampling of reporting vehicles and associated surrounding vehicles on a roadway segment provides a quantity of information from which the system derives precise inferences about the presence of lane obstructions. From the identifications, the lane obstruction system, in one aspect, communicates warnings to oncoming vehicles thereby improving awareness of the oncoming vehicles about potential hazards and irregular traffic flows resulting from the lane obstructions. In this way, the disclosed lane obstruction system leverages observations from and about many different vehicles to infer the presence of obstructions within lanes and to thereby improve the detection of lane obstructions. The improved ability to detect lane obstructions provides for secondary improvements in the functioning of the vehicles themselves by improving the avoidance of hazards, and traffic flow around the hazards.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein to identifying lane obstructions. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

Additionally, the disclosure further discusses the vehicle 100 as traveling on a roadway that includes multiple lanes. However, the present approach may be applied to roadways of varying configurations (e.g., 2, 3, 4 or more lanes traveling in a single direction). In general, the approach provided herein is characterized by a reporting vehicle (e.g., vehicle 100) observing surrounding vehicles that are traveling in the same direction along a roadway. In some instances, the lane obstruction system 170 may provide inferences about lane obstructions associated with observations of vehicles that are not moving along a roadway segment with the vehicle 100 (e.g., on parallel service roads, etc.); however, such configurations are generally understood to be within variations of the disclosed systems and methods and thus are not discussed in detail herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a lane obstruction system 170 that is implemented to perform methods and other functions as disclosed herein relating to improving lane obstruction detection. As will be discussed in greater detail subsequently, the lane obstruction system 170, in various embodiments, is implemented partially within the vehicle 100, and as a cloud-based service. For example, in one approach, functionality associated with at least one module of the lane obstruction system 170 is implemented within the vehicle 100 while further functionality is implemented within a cloud-based computing system.

Figure 2:
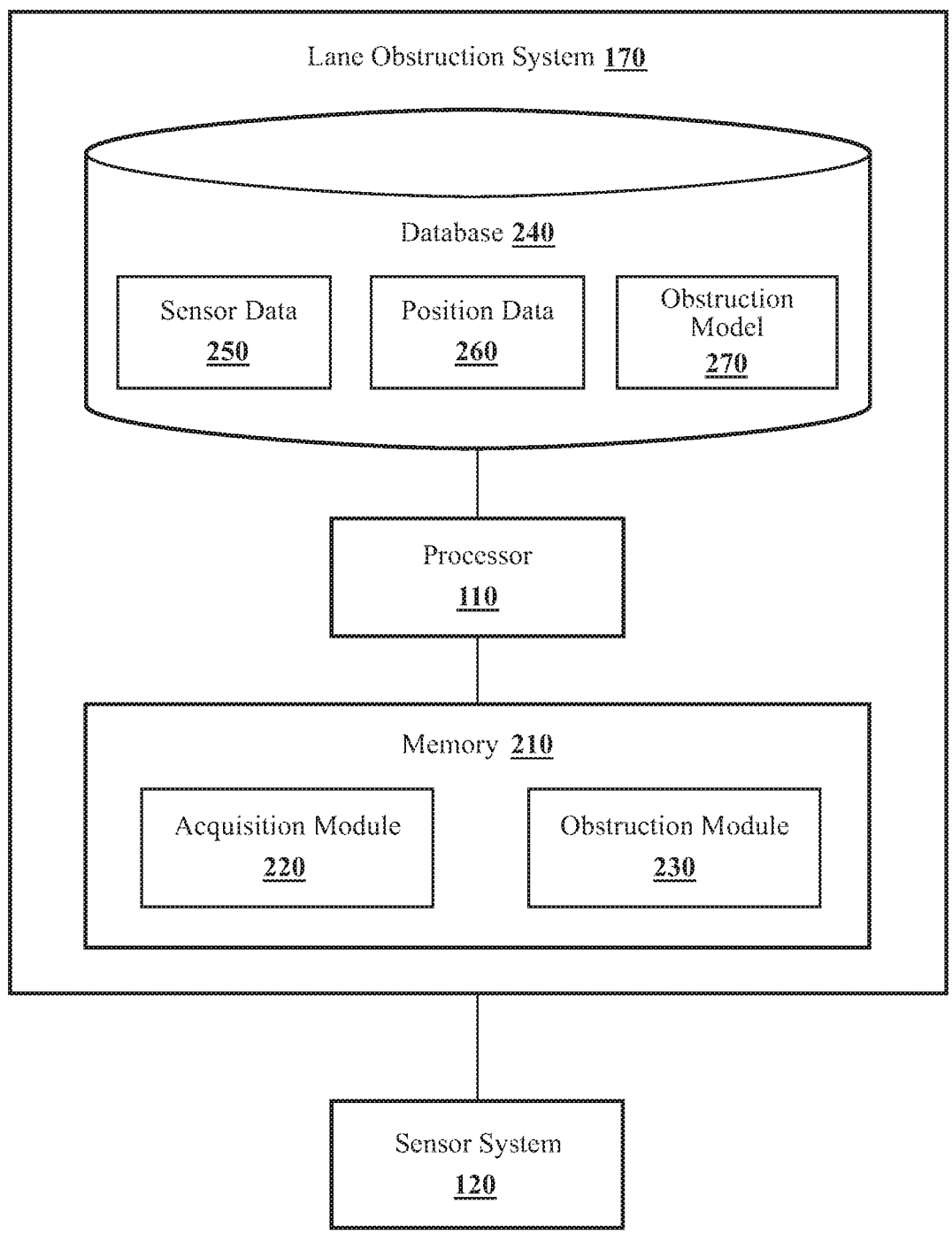
FIG. 2 illustrates one embodiment of a lane obstruction system that is associated with using observations of surrounding vehicles to infer the presence of lane obstructions.

With reference to FIG. 2, one embodiment of the obstruction system 170 of FIG. 1 is further illustrated. The obstruction system 170 is shown as including a processor 110 from the vehicle 100 of FIG. 1. Accordingly, the processor 110 may be a part of the lane obstruction system 170, the lane obstruction system 170 may include a separate processor from the processor 110 of the vehicle 100, or the lane obstruction system 170 may access the processor 110 through a data bus or another communication path. In one embodiment, the obstruction system 170 includes a memory 210 that stores an acquisition module 220 and an obstruction module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
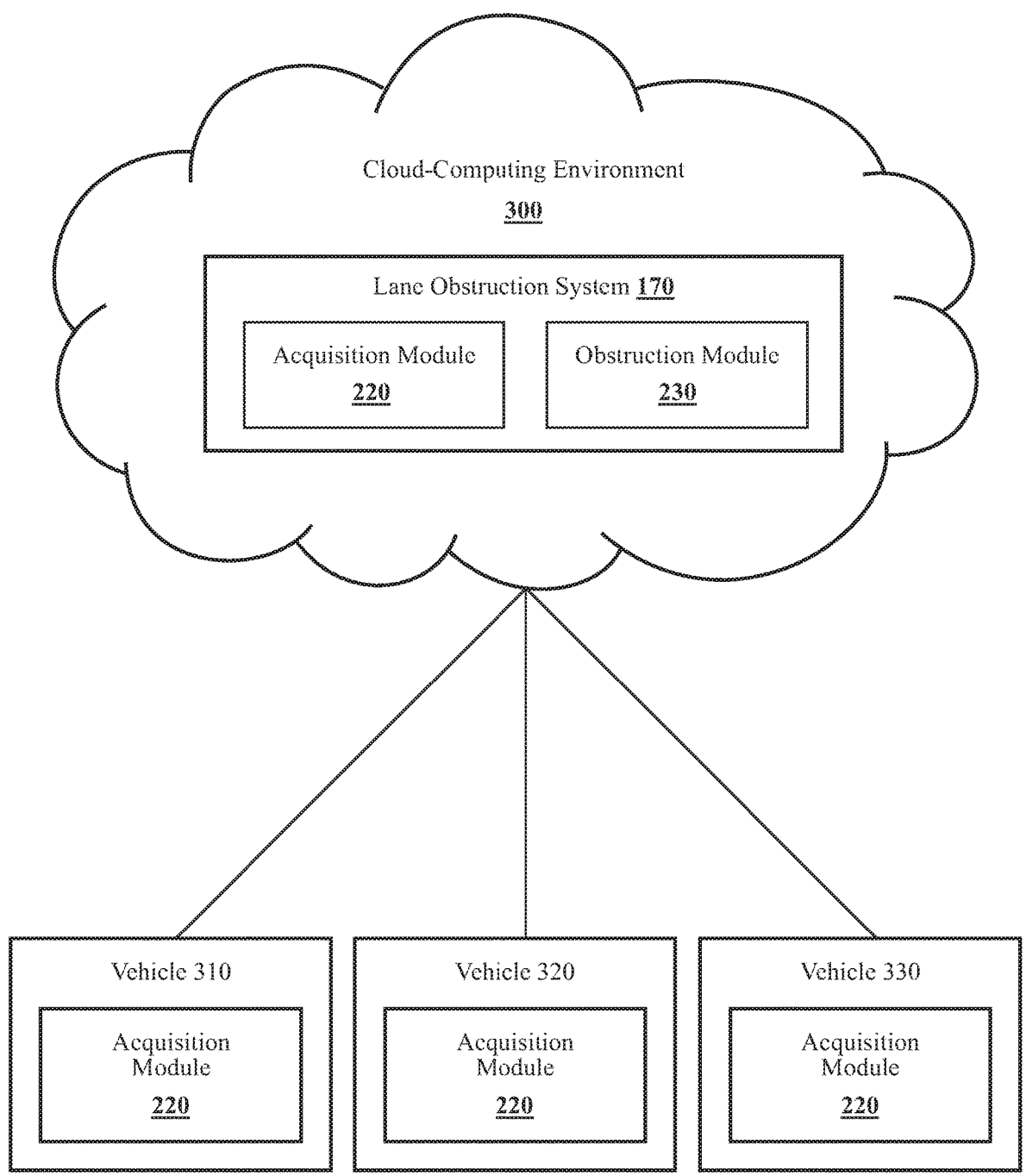
FIG. 3 illustrates one embodiment of the lane obstruction system of FIG. 2 in a cloud-computing environment.

The lane obstruction system 170 as illustrated in FIG. 2 is generally an abstracted form of the lane obstruction system 170 as may be implemented between the vehicle 100 and a cloud-computing environment. FIG. 3 illustrates one example of a cloud-computing environment 300 that may be implemented along with the lane obstruction system 170. As illustrated in FIG. 3, the lane obstruction system 170 is embodied in part within the cloud-computing environment 300 and also within the respective vehicles 310, 320, and 330. That is, the vehicles 310, 320, and 330 each include the acquisition module 220 or at least a portion thereof while the cloud-computing environment 300 includes the acquisition module 220 and the obstruction module 230 or at least relevant portions thereof. Thus, the acquisition module 220 is generally implemented within both aspects of the system 170 in order to provide for handling of the electronic data that includes the observations.

Moreover, the vehicles 310, 320, and 330 generally represent reporting vehicles that are equipped with sensors to execute the observations of the surrounding vehicles. That is, the vehicles 310, 320, and 330 are, for example, autonomous, semi-autonomous, or another arrangement of vehicles that include sensors capable of perceiving other vehicles within a surrounding environment such that relative locations of the surrounding vehicles can be generated from the sensor data. Additionally, while three vehicles are illustrated, it should be appreciated that as a general matter the number of vehicles is not limited but instead includes any number of vehicles that are equipped in the noted manner and provide reports about the location and the surrounding vehicles.

With reference to FIG. 2, the acquisition module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the acquisition module 220, in one embodiment, acquires sensor data 250 that includes at least camera images. In further arrangements, the acquisition module 220 acquires the sensor data 250 from further sensors such as a radar 123, a LiDAR 124, and other sensors as may be suitable for identifying vehicles and locations of the vehicles.

Accordingly, the acquisition module 220, in one embodiment, controls the respective sensors to provide the data inputs in the form of the sensor data 250. Additionally, while the acquisition module 220 is discussed as controlling the various sensors to provide the sensor data 250, in one or more embodiments, the acquisition module 220 can employ other techniques to acquire the sensor data 250 that are either active or passive. For example, the acquisition module 220 may passively sniff the sensor data 250 from a stream of electronic information provided by the various sensors to further components within the vehicle 100. Moreover, the acquisition module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of measurements acquired from multiple sensors.

In addition to locations of surrounding vehicles, the sensor data 250 may also include, for example, information about lane markings, and so on. Moreover, the acquisition module 220, in one embodiment, controls the sensors to acquire the sensor data 250 about an area that encompasses 360 degrees about the vehicle 100 in order to provide a comprehensive assessment of the surrounding environment. Of course, in alternative embodiments, the acquisition module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the lane obstruction system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the database 240 further includes position data 260 as generated by the acquisition module 220. In embodiments where the database 240 is implemented as part of a cloud-computing environment, the position data 260 includes data aggregated from multiple separate reporting vehicles.

As a further explanation, the sensor data 250 can include 3D point cloud data, camera images and/or video from the camera 126, radar measurements, and so on. In further embodiments, the sensor data 250 includes information from further sensors (e.g., an IMU) that may be used to perform various tasks (e.g., motion blur correction) in support of the processes noted herein.

The acquisition module 220, in one embodiment, is further configured to perform additional tasks beyond controlling the respective sensors to acquire and provide the sensor data 250. For example, the acquisition module 220 initially analyzes the sensor data 250 to distinguish surrounding vehicles from the surrounding environment (e.g., background, roadway, etc.). In various approaches, the acquisition module 220 employs different object recognition techniques to identify the surrounding vehicles. The particular technique employed to identify the surrounding vehicles may depend on available sensors within the vehicle 100, computational abilities (e.g., processor power) of the vehicle 100, and so on.

In one approach, the acquisition module 220 uses a machine learning algorithm embedded within the acquisition module 220, such as a convolutional neural network (CNN), to perform semantic segmentation over the sensor data 250 from which the surrounding vehicles are identified and extracted. Of course, in further aspects, the acquisition module 220 may employ different machine learning algorithms or implements different approaches for performing the semantic segmentation which can include deep convolutional encoder-decoder architectures, a multi-scale context aggregation approach using dilated convolutions, or another suitable approach that generates semantic labels for the separate object classes represented in the image. Whichever particular approach the acquisition module 220 implements, the acquisition module 220 provides an output with semantic labels identifying objects represented in the sensor data 250. In this way, the lane obstruction system 170 distinguishes between objects and boundaries between the objects.

Additionally, the acquisition module 220 is generally capable of identifying the surrounding vehicles in order to acquire measurements about positions of the surrounding vehicles from the sensor data 250. Thus, by way of example, the acquisition module 220, in one approach, initially acquires the sensor data 250, fuses the sensor data 250 from multiple sensors (i.e., registers and combines information), identifies the surrounding vehicles within the sensor data 250, and then determines relative positions associated with the surrounding vehicles according to, for example, measurements embodied within the sensor data 250.

The acquisition module 220 determines the measurements by, for example, analyzing the sensor data 250 for each of the surrounding vehicles relative to a center position of the reporting vehicle 100. That is, in one approach, the acquisition module 220 measures from a centroid of the vehicle 100 to the surrounding vehicle. Alternatively, the acquisition module 220 measures form a center point of a lane in which the reporting vehicle 100 is traveling, a forward edge center point of the reporting vehicle 100, a location of a controlling sensor, or another defined point of the reporting vehicle 100. In either case, the acquisition module 220 functions to translate the points together into a single reference point or generally use a single one of the noted points in order to maintain consistency between measurements.

A point on a surrounding vehicle that is being measured to by the reporting vehicle 100 can vary according to a particular implementation. In one approach, the acquisition module 220 measures to a centroid of a respective surrounding vehicle, which may be derived/assessed according to the identification of the surrounding vehicle. Alternatively, the acquisition module 220 may identify a closest point on the surrounding vehicle and determine a relative lateral center point related thereto to define a measurement point of the surrounding vehicle. In this way, the acquisition module 220 can adjust to varying detection positions (e.g., forward, adjacent, aft) of surrounding vehicles to provide a consistent measurement.

Additionally, in further aspects, the acquisition module 220 also processes the sensor data 250 to identify lanes within a roadway segment on which the vehicle 100 is traveling. For example, the acquisition module 220 may use similar techniques as employed to identify the surrounding vehicles. In further aspects, the acquisition module 220 uses high definition maps of a location to identify lane boundaries. In still further aspects, the acquisition module 220 uses a combination of maps and image recognition via onboard cameras to determine lane boundaries relative to the vehicle 100. In further aspects, the acquisition module 220, in one embodiment, uses existing lane identification functionality as may be provided for by integrated lane-keeping functions or autonomous driving functions to determine lane boundaries. In either case, the acquisition module 220 may function to identify the lane boundaries relative to the vehicle 100.

Furthermore, as previously indicated, the acquisition module 220 provides, in one embodiment, the measurements from the sensor data 250 for the identified surrounding vehicles as the position data 250. The measurements are, in one embodiment, quantities of distance and direction relative to the measurement point of the reporting vehicle 100. Thus, the measurements can be in the form of distance and direction, line quantities (e.g., two endpoints on a 2D plane, etc.), or in another suitable form. In one approach, the measurements are provided in a data structure that maintains a history of measurements associated with a unique surrounding vehicle. Thus, the acquisition module 220 provides an individual measurement as, for example, a data struct that stores a timestamp of the measurement, a unique identifier of the surrounding vehicle associated with the measurement, position, and position variance. The precise form of the position can vary according to implementation. For example, the position can be provided as a relative 2D position in a plane of the roadway relative to the measurement point of the vehicle 100 as previously described. Alternatively, the acquisition module 220 may generate the position as a GPS coordinate relative to a known GPS coordinate of the vehicle 100.

In either case, the acquisition module 220 stores the measurements in a data structure together as a history of positions for each surrounding vehicle. The acquisition module 220 may track the surrounding vehicles in the history of measurements over a relative distance window from the vehicle 100. That is, for example, the acquisition module 220 can initially acquire a surrounding vehicle at a distance of 100 meters in front or behind the reporting vehicle 100 and generally traveling in a same direction as the reporting vehicle 100. Thus, when the surrounding vehicle lapses from this tracking window, the measurements for the surrounding vehicle may be removed from the history, logged, or otherwise no longer considered in the context of tracking for identifying potential road hazards. It should be appreciated that while a tracking window of +/− 100 m is noted, the particular tracking window implemented by the lane obstruction system 170 may vary according to sensor fidelity, and/or other controlling factors.

While different approaches to identifying and locating surrounding vehicles may be undertaken, the acquisition module 220, for example, analyzes the sensor data 250 to generate observations of surrounding vehicles that are provided as the position data 260. As indicated, the position data 260 includes relative positions of the surrounding vehicles in relation to the reporting vehicle (e.g., vehicle 100). In further aspects, the position data 260 for the respective surrounding vehicles may be provided using absolute locations in the roadway segment, vehicle paths/tracks (e.g., positions over a period of time), or in another suitable form.

In either case, the acquisition module 220 generally leverages computational resources of the vehicle 100 and associated sensors to identify the surrounding vehicles from the sensor data 250 (e.g., object recognition and localization), and provide refined observations in the form of identifications of the surrounding vehicles and associated locations. Furthermore, the sensor data 250 and the position data 260 derived therefrom also include locations of the vehicle 100. That is, acquisition module 220 generally acquires locations of the vehicle 100 itself through GPS data, and/or locations derived through localizing on a feature-based map. As an additional aspect, the acquisition module 220 generates the position data 260 to include separate identifiers corresponding with lane changes, changes in speed that may be indicative of lane obstructions, and other variations in location and speed that may further efforts to identify lane obstructions.

Of course, in one embodiment, the aggregated position data 260 is stored within a cloud-based computing system (e.g., environment 300) as received from the separate vehicles which include separate instances of the acquisition module 220. In further embodiments, the database 240 and/or the memory 210 store an obstruction model 270 which is a statistical or learning model that characterizes positions of surrounding vehicles to generate indirect determinations/inferences of whether obstructions are present within lanes of a road. In various approaches, the obstruction model 270 can take different forms depending on various aspects relating to the implementation.

In one embodiment, the obstruction module 230 generally includes instructions that function to control the processor 110 or collection of processors in the cloud-computing environment 300 to analyze the position data 260 according to the obstruction model 270. It should be appreciated that the obstruction module 230 in combination with the obstruction model 270 can form a computational model such as a machine learning logic, deep learning logic, a neural network model, or another similar approach. In one embodiment, the obstruction model 270 is a statistical model such as a regression model that estimates the conditional expectation of the lane obstruction given the observations. Accordingly, the obstruction model 270 can be a polynomial regression (e.g., least weighted polynomial regression), least squares or another suitable approach.

Moreover, in alternative arrangements, the obstruction model 270 is a probabilistic approach such as a hidden Markov model. In either case, the obstruction module 230, when implemented as a neural network model or another model, in one embodiment, electronically accepts the aggregated position data 260 as an input. Accordingly, the obstruction module 230 in concert with the model 270 produce various determinations/assessments (e.g., identified patterns correlating with lane obstructions) as an electronic output that characterizes the noted aspect as, for example, a single electronic value. Moreover, in further aspects, the system 170 can collect the noted data, log responses, and use the data and responses to subsequently further train the model 270.

As an additional note, it should be appreciated that the obstruction module 230 and the model 270 while discussed as being implemented within the cloud-computing environment 300 or, more generally, separate from the vehicle 100 may be implemented within the vehicle 100 in one or more approaches. In such a configuration, the acquisition module 220 may aggregate the position data 260 using, for example, vehicle-to-vehicle (V2V) communications or another suitable approach.

In any case, the obstruction module 230 is generally configured to generate an electronic signal identifying the presence of a lane obstruction when the aggregated position data 260 indicates a pattern that correlates with a lane obstruction. Thus, the obstruction module 230 may use the electronic signal to cause various outcomes to occur in relation to the identification of the lane obstruction. In one embodiment, the obstruction module 230, in response to the electronic signal, queries a vehicle location service to identify vehicles that are approaching the lane obstruction. For example, an OEM or other provider may track vehicles in order to maintain awareness of locations of the vehicles for various services. Accordingly, the obstruction module 230 identifies which vehicles are approaching the lane obstruction via the location service and communicates the electronic signal to the relevant vehicles. In one embodiment, the obstruction module 230 uses the electronic signal conveyed to the oncoming vehicles as a mechanism to warn the oncoming vehicles about the presence of the lane obstruction.

As such, the communication embodied by the electronic signal, in various approaches, provides various levels of granularity about the lane obstruction. For example, in one approach, the communication simply indicates a general area (e.g., roadway segment) associated with the lane obstruction. In further approaches, the obstruction module 230 indicates the lane within the roadway segment associated with the lane obstruction, while in still further approaches, the obstruction module 230 indicates a precise location (e.g., precise GPS coordinates). Whichever approach is undertaken, the identification of the lane obstruction to the oncoming vehicles generally serves to cause the oncoming vehicles to undertake some preventative measure to avoid the lane obstruction. For example, the oncoming vehicles may perform actions in response to the electronic signal such as warning a driver/passenger, re-routing the vehicle, decreasing a speed, updating a route to avoid the specified lane, and so on. In this way, the lane obstruction system 170 improves detection of hazards within a roadway and thus provides for improved navigation and avoidance of such hazards by oncoming vehicles.

Figure 4:
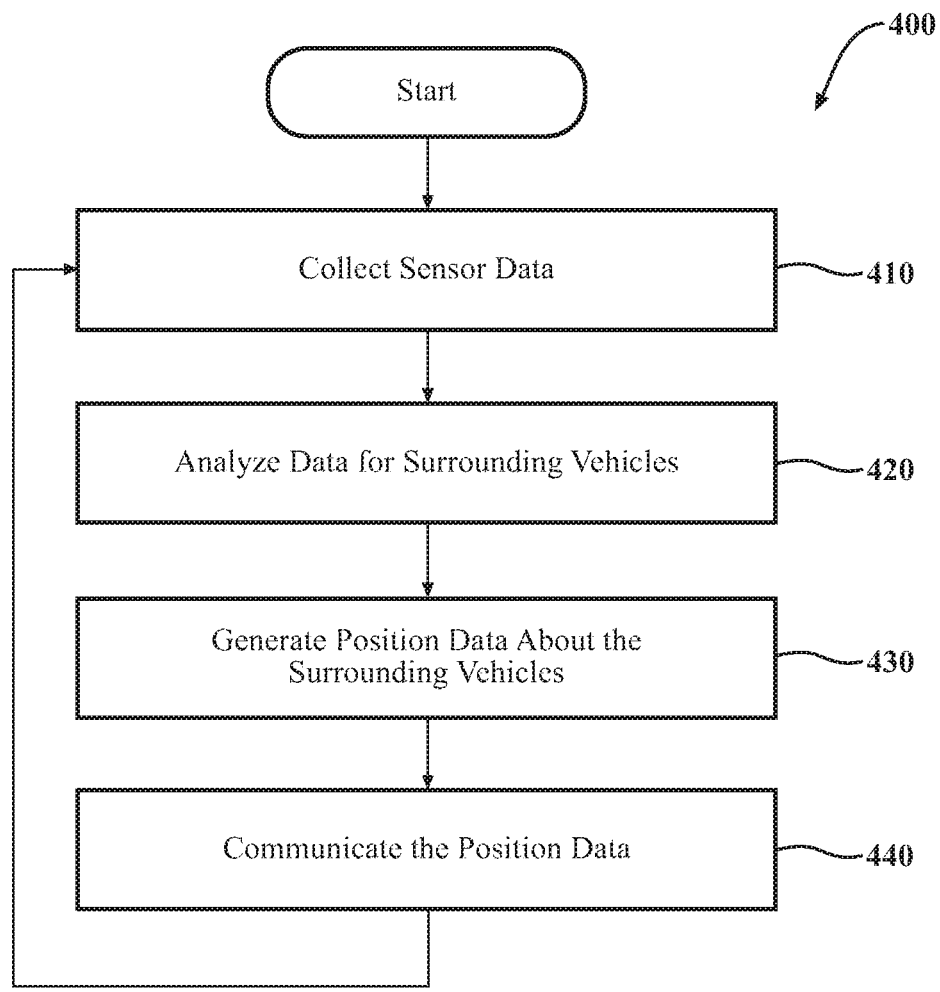
FIG. 4 illustrates one embodiment of a method that is associated with observing and reporting position data about surrounding vehicles.

Additional aspects of identifying lane obstructions will be discussed in relation to FIG. 4. FIG. 4 illustrates a flowchart of a method 400 that is associated with collecting position data about surrounding vehicles of a reporting vehicle. Method 400 will be discussed from the perspective of the lane obstruction system 170 of FIGS. 1, 2, and 3. While method 400 is discussed in combination with the lane obstruction system 170, it should be appreciated that the method 400 is not limited to being implemented within the lane obstruction system 170 but is instead one example of a system that may implement the method 400.

At 410, the acquisition module 220 controls the sensor system 120 to acquire the sensor data 250. In one embodiment, the acquisition module 220 controls the radar sensor 123 and the camera 126 of the vehicle 100 to observe the surrounding environment. Alternatively, or additionally, the acquisition module 220 controls the camera 126 and the LiDAR 124 or another set of sensors to acquire the sensor data 250. As part of controlling the sensors to acquire the sensor data 250, it is generally understood that the sensors acquire the sensor data 250 of a region around the reporting vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the acquisition module 220, in one embodiment, controls the sensors to acquire the sensor data 250 of the surrounding environment.

Moreover, in further embodiments, the acquisition module 220 controls the sensors to acquire the sensor data 250 at successive iterations or time steps. Thus, the lane obstruction system 170, in one embodiment, iteratively executes the functions discussed at blocks 410-420 to acquire the sensor data 250 and provide information therefrom. Furthermore, the acquisition module 220, in one embodiment, executes one or more of the noted functions in parallel for separate observations in order to maintain updated perceptions. Additionally, as previously noted, the acquisition module 220, when acquiring data from multiple sensors, fuses the data together to form the sensor data 250 and to provide for improved determinations of detection, location, and so on.

At 420, the acquisition module 220 analyzes the sensor data 250 to identify the surrounding vehicles including relative locations of the surrounding vehicles. In one embodiment, the acquisition module 220 within the vehicle 100 processes the sensor data 250 in order to detect surrounding vehicles traveling on the roadway segment with the reporting vehicle. In one embodiment, the acquisition module 220 applies, as previously noted, semantic segmentation or another object recognition approach to the sensor data 250 in order to detect/identify the surrounding vehicle(s). It should be appreciated that the systems and methods disclosed herein perform the noted tasks to detect a single or multiple surrounding vehicles depending on current conditions.

Of course, the acquisition module 220 may also identify further features in addition to the surrounding vehicles such as roads, buildings, lane markings, curbs, sidewalks, signs, posts, trees, and so on. In this way, the lane obstruction system 170 delineates between aspects of the surrounding environment to extract the surrounding vehicles. Moreover, the acquisition module 220, in one approach, further employs one or more additional sources such as other vehicles, infrastructure sensors, high-definition maps, and so on to delineate different aspects (e.g., lane markings) of the surrounding environment.

At 430, the acquisition module 220 generates position data for detected surrounding vehicles. In one embodiment, the acquisition module 220 generates the position data 260 as a relative position of the surrounding vehicle in relation to the reporting vehicle 100. The relative position is determined, in one approach, from a center point of the lane in which the reporting vehicle 100 is traveling and from a longitudinal location in the lane of the reporting vehicle 100. In further aspects, the relative position is determined from a centroid of the reporting vehicle 100 or another suitable location. In any case, the acquisition module 220 generally determines the relative position as a measurement to a lateral geometric center of the surrounding vehicle. Thus, the relative position is generally defined according to a position in a two-dimensional coordinate system with the reporting vehicle 100 located at a center thereof. As such, the acquisition module 220 can provide the position data as a set of relative measurements for the surrounding vehicles in relation to an absolute measurement (e.g., GPS coordinates) for the reporting vehicle 100. In alternative approaches, the acquisition module 220 generates the position data 260 from the sensor data 250 to include absolute measurements for both the surrounding vehicles and the reporting vehicle 100. In either case, the acquisition module 220 produces the position data 260 as a reporting of locations for the vehicles in order to facilitate knowledge of locations of the vehicles and positions within the roadway segment over time.

As such, in a still further approach, the acquisition module 220 maintains the position data 260 as a vehicle track/path for the surrounding vehicles and the reporting vehicle 100. In one embodiment, the acquisition module 220 appends successive observations together for each vehicle to generate a history of observations that form a path the respective vehicle has traveled along the roadway segment. The acquisition module 220 may associate a unique identifier with the separate vehicles that facilitates tracking the vehicles between observations. Thus, as indicated, the history of observations for the vehicles is updated, and, for example, intermittently reported.

At 440, the acquisition module 220 communicates an electronic data structure that includes the position data 260 to a remote device. In one embodiment, the acquisition module 220 electronically transmits the data structure to the obstruction module 230. As previously discussed, the obstruction module 230 may be situated in a remote location such as within a cloud-computing environment, distributed computing environment, remote server, or another suitable configuration. In either case, the reporting vehicle 100 functions to provide the position data 260 about the locations of the vehicles in order to communicate real-time or near real-time information about traffic patterns within a roadway segment. As such, as multiple reporting vehicles travel over the same roadway segment, a comprehensive understanding of the lanes and possible lane obstructions can be developed with the use of only a subset of vehicles that are traveling over the roadway segment. That is, even though the reporting vehicles that are providing information about the roadway segment may represent a relatively small percentage of vehicles actually traversing the roadway segment, because the reporting vehicles track surrounding vehicles in addition to their own locations, the aggregated position data 260 can represent a majority of vehicles actually traversing the roadway segment. Thus, the reporting vehicles collectively function to provide a comprehensive sampling of the traffic pattern on the roadway segment, and thereby improve the ability to subsequently identify lane obstructions.

Figure 5:
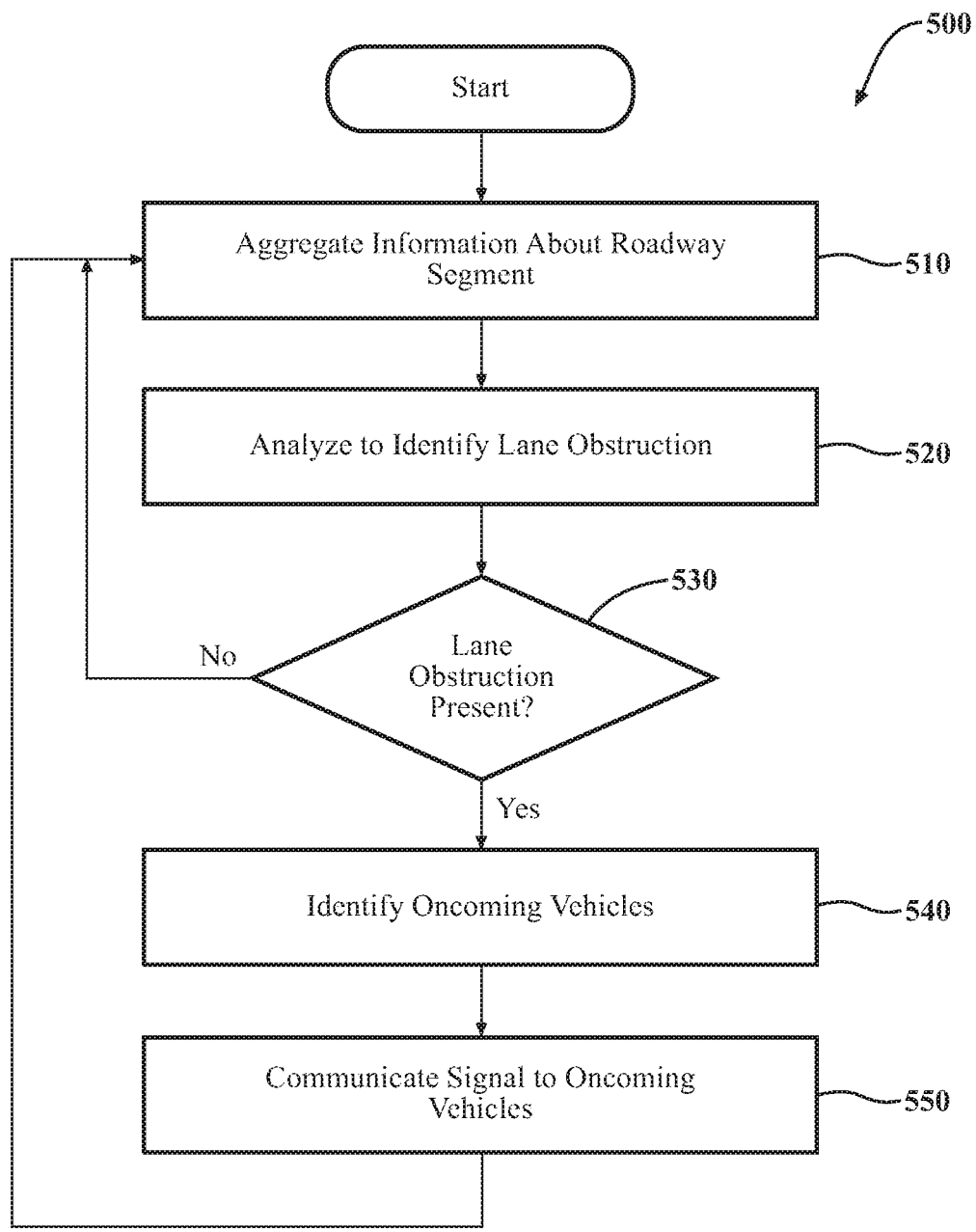
FIG. 5 illustrates one embodiment of a method that is associated with aggregating observations from a plurality of reporting vehicles to identify lane obstructions.

As a further explanation of how the lane obstruction system 170 improves the identification of lane obstructions, consider FIG. 5. Method 500 will be discussed from the perspective of the lane obstruction system 170 of FIGS. 1, 2, and 3. While method 500 is discussed in combination with the lane obstruction system 170, it should be appreciated that the method 500 is not limited to being implemented within the lane obstruction system 170 but is instead one example of a system that may implement the method 500.

At 510, the acquisition module 220 collects the position data 260. In one embodiment, the acquisition module 220 aggregates the position data 260 from a plurality of reporting vehicles. Of course, because the reporting vehicles are generally located at different locations across a geographic area, the acquisition module 220, in one embodiment, filters incoming communications into respective electronic data stores (e.g., storage buckets) according to a roadway segment associated therewith. However, for purposes of the present discussion, the communications and associated position data 260 acquired therefrom are considered to relate to a single roadway segment. Thus, the acquisition module 220 acquires the position data 260 for a particular roadway segment. In general, the roadway segment may be defined according to a predefined length, a logical division (e.g., segment between city blocks), or another suitable metric. In any case, the roadway segment is generally defined as a section of roadway including lanes of a particular travel direction. That is, a south-bound and a north-bound section of the same highway may be defined as separate roadway segments for purposes of this disclosure. More generally, the roadway segment is a section of roadway on which any obstruction may influence travel in adjacent lanes.

In either case, the acquisition module 220 acquires the position data 260 for the roadway segment in order to, for example, accumulate a sufficient sample of vehicles passing over the roadway segment to capture a representation of preferred paths along the roadway segment. Moreover, the acquisition module 220, in one embodiment, aggregates the position data 260 for a defined period of time before, for example, shifting the position data 260 (or an oldest portion of the position data 260) into an archive. Thus, the acquisition module 220 can treat separate portions of the position data 260 as having a viable lifetime within which the information included therein is considered to be accurate or representative of a current condition on the roadway segment. The viable lifetime for the position data 260 may vary according to a particular implementation and may fluctuate according to various metrics such as time of day, traffic flow, throughput of the particular roadway segment, and so on. In either case, the acquisition module 220 stores the position data 260 in an electronic data store to maintain a representation of traffic patterns on the roadway segment.

At 520, the obstruction module 230 analyzes the position data 260 to identify whether observed positions correlate with an obstruction pattern that is indicative of a lane obstruction. In one embodiment, the lane obstruction is any abnormal condition of the roadway that obstructs/impedes normal passage of vehicles with the flow of traffic. Thus, the lane obstruction may be a hazardous object blocking a lane or lanes, a condition within the roadway such as a pothole, an object or condition that causes vehicles to slow down but does not fully block travel within a lane, and so on.

Thus, the obstruction pattern is generally indicative of variations in a traffic flow through a lane that indicates an obstruction is present. For example, in various occurrences, the obstruction pattern indicates occurrences of lane changes around a lane, braking at similar locations in a lane, and so on. In one embodiment, the obstruction model 270 is a machine learning model, a statistical model, or some other characterization of traffic patterns that identifies patterns matching those that occur in correlation with lane obstructions. Thus, in various approaches, the model 270 is trained to identify when a traffic pattern embodied in the position data 260 is indicative of a lane obstruction. As such, the obstruction module 230 identifies traffic patterns correlating with known obstruction patterns that are indicative of blocking of a lane, blocking of multiple lanes, blocking of part of a lane, braking by vehicles in a lane, and so on.

At 530, the obstruction module 230 determines whether a lane obstruction is present. In one embodiment, the obstruction module 230 further analyzes the position data 260 including determinations made by the obstruction module 230 at 520. That is, when the obstruction module 230 determines that obstruction patterns that correlate with lane obstructions are present, the obstruction module 230 undertakes an additional review at 530 to determine whether the pattern is sufficiently pervasive. For example, in one embodiment, the obstruction module 230 determines whether identified obstruction patterns correspond with a threshold number of vehicles. In one approach, the obstruction module 230 identifies the presence of the obstruction pattern in the position data 260 against, for example, at least a number "n" vehicles exhibiting the obstruction pattern within a defined period of time (e.g., 1 hour). In further approaches, the obstruction model 270 may indicate an absolute determination by accounting for frequency within the analysis at 520.

In either case, if the obstruction module 230 determines that there is no corresponding obstruction pattern and/or an insufficient frequency of the obstruction pattern, then the obstruction module 230 does not progress to generate a warning or other signal to oncoming vehicles. However, if the position data 260 is determined to be indicative of a lane obstruction, then the obstruction module 230 proceeds with steps to inform other vehicles.

At 540, the obstruction module 230 queries a location service to identify oncoming vehicles that are approaching the road segment including the lane obstruction. In one embodiment, as previously noted, the obstruction module 230 queries an OEM tracking service or other service that is aware of locations of vehicles respective to the roadway segment. In further aspects, the obstruction module 230 may query for available secondary alert services such as dynamic traffic boards or other mechanisms for providing information to oncoming vehicles that is outside of the actual vehicle. In still further aspects, the obstruction module 230 may provide a broadcast over a wireless communication protocol (e.g., V2V, V2I). In any case, the location service and/or alert service provide information relating to the presence of vehicles and/or other warning mechanisms. In general, the obstruction module 230 acquires network addresses or other communication addresses/identifiers (e.g., IP address, phone number, etc.) in order to direct the information about the presence of the lane obstruction to the oncoming vehicles.

At 550, the obstruction module 230 provides an electronic signal. In one embodiment, the obstruction module 230 provides the electronic signal identifying the lane obstruction to the oncoming vehicles of the roadway segment. That is, the obstruction module 230 communicates the signal as a warning about the lane obstruction to the oncoming vehicles, to a dynamic highway sign along a route before the roadway segment, and/or to another specified device (e.g., mobile phone) in order to convey information about the lane obstruction. The form of the signal itself may vary according to a particular implementation but is generally an electronic transmission that is at least partially over a wireless communication medium. In this way, the lane obstruction system 170 aggregates the position data 260 about a multiplicity of vehicles traveling over a road segment using a network of reporting vehicles and provides road and associated traffic conditions therefrom to improve how subsequent oncoming vehicles navigate the road segment.

Figure 6:
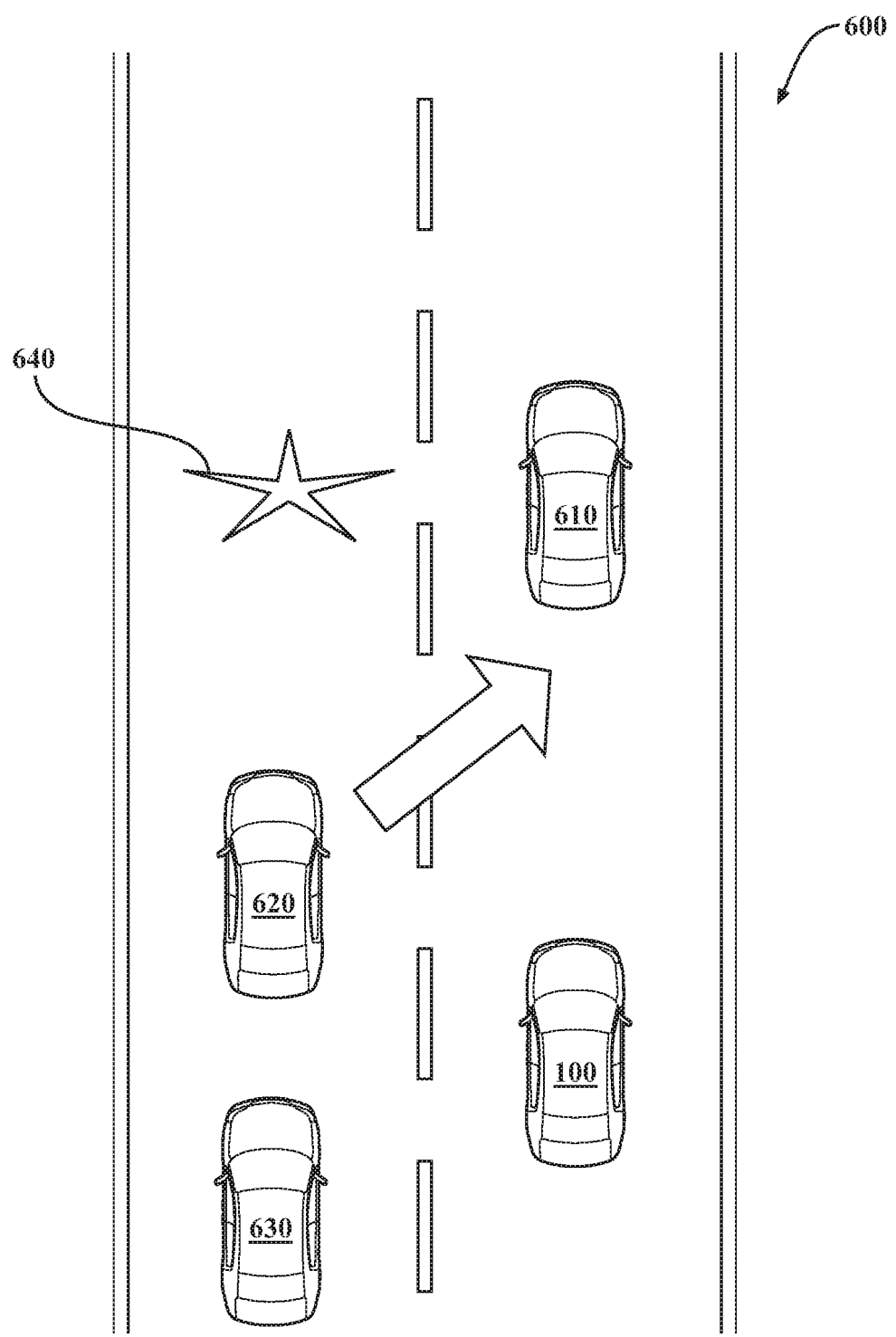
FIG. 6 illustrates one example of a configuration of vehicles on a roadway segment that includes a lane obstruction.
Figure 7:
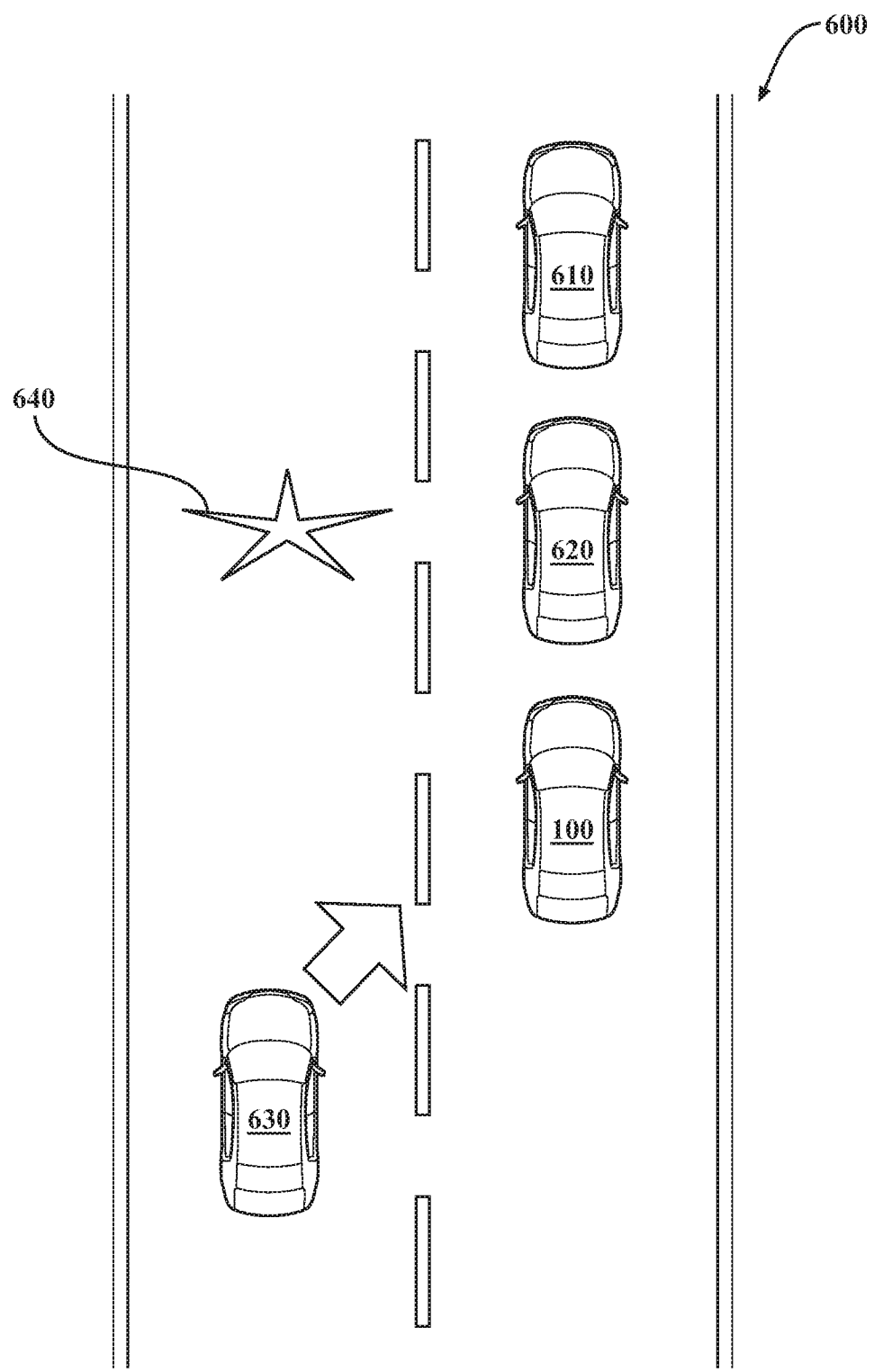
FIG. 7 illustrates a successive point in time of the configuration of vehicles from FIG. 6.
Figure 8:
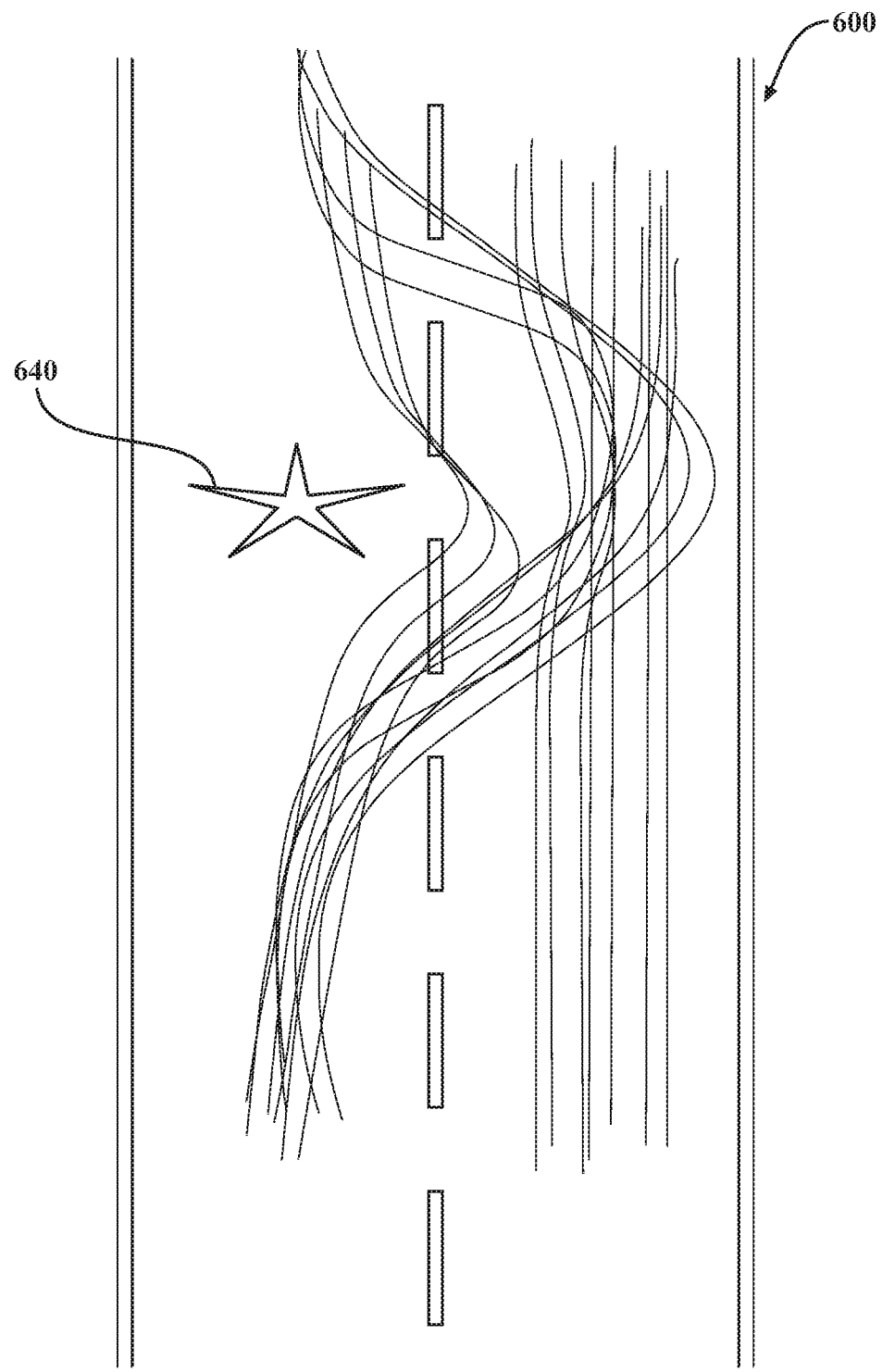
FIG. 8 illustrates an example of aggregated position data over the roadway segment illustrated in FIGS. 6-7.

As a further explanation of how the lane obstruction system 170 identifies and provides communications about potential lane obstructions consider FIGS. 6-8. FIG. 6 illustrates an example of a roadway segment 600. The roadway segment 600 is illustrated as including the reporting vehicle 100, surrounding vehicles 610, 620, 630, and a lane obstruction 640. Thus, from the perspective of the reporting vehicle 100, the lane obstruction 640 is, for example, latent and, thus, generally unobserved by the reporting vehicle 100. However, the surrounding vehicles 610, 620, and 630 are perceived by sensors of the vehicle 100. Thus, as the vehicle 100 is progressing along the roadway segment 600, the system 170 acquires sensor data about the vehicles 610, 620, 630 and develops the sensor data into position data that effectively tracks the vehicles 610, 620, and 630. As such, the system 170 observes movements of the vehicles 620 and 630 away from the lane obstruction 640 through the position data.

As further illustrated at a successive time step in FIG. 7, the vehicle 620 changes lanes in front of the vehicle 100 to avoid the obstruction 640, while the vehicle 630 brakes and begins to switch lanes. Thus, the system 170 within the vehicle 100 observes these movements/positions and reports the positions back to the obstruction module 230. FIG. 8 illustrates aggregated position data 260 over the roadway segment 600 as may be collected from a plurality of reporting vehicles. The aggregated position data 260 illustrates an obstruction pattern where no vehicles are observed traversing an area associated with the lane obstruction 640. Moreover, the correlated movements between successive vehicles to avoid the particular area of the lane obstruction 640 further affirms the presence of the lane obstruction 640. Thus, while the reporting vehicles 100 may not directly observe the lane obstruction 640, the system 170 identifies the lane obstruction 640 through the obstruction pattern observed in the aggregated position data 260 that is generally defined by the lack of observations for vehicles driving through the area of the lane obstruction 640 and the correlations of vehicle positions/paths explicitly avoiding the area.

Moreover, while not explicitly illustrated, the arrested speeds of vehicles approaching the lane obstruction 640 are also indicative of the lane obstruction 640 and considered as a factor by the obstruction module 230 when analyzing the position data 260. In either case, the obstruction module 230 provides the noted communications to warn vehicles of the lane obstruction upon analyzing the aggregated data as illustrated in FIG. 8. In this way, the lane obstruction system 170 improves awareness about latent road hazards/obstructions thereby improving overall navigation and avoiding of such issues.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the lane obstruction system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the lane obstruction system 170, and/or the autonomous driving module(s) 160 may control some or all of these vehicle systems 140 and, thus, may be partially or fully autonomous.

The processor(s) 110, the lane obstruction system 170, and/or the autonomous driving module(s) 160 can be operatively connected to communicate with the various vehicle systems 140 and/or individual components thereof. For example, returning to FIG. 1, the processor(s) 110, the lane obstruction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the lane obstruction system 170, and/or the autonomous driving module(s) 160 may control some or all of these vehicle systems 140.

The processor(s) 110, the lane obstruction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the lane obstruction system 170, and/or the autonomous driving module(s) 160 can control the direction and/or speed of the vehicle 100. The processor(s) 110, the lane obstruction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the lane obstruction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable sources. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A lane obstruction system for identifying lane obstructions, comprising:
one or more processors;
a memory communicably coupled to the one or more processors and storing:
an acquisition module including instructions that when executed by the one or more processors cause the one or more processors to collect, in an electronic data store, position data of surrounding vehicles observed by reporting vehicles that travel over a roadway segment; and
an obstruction module including instructions that when executed by the one or more processors cause the one or more processors to analyze the position data to identify whether observed positions correlate with an obstruction pattern that is indicative of a lane obstruction in at least one lane of the roadway segment, and
wherein the obstruction module further includes instructions to, in response to determining the position data indicates the lane obstruction, provide a signal identifying the lane obstruction to oncoming vehicles of the roadway segment.

2. The lane obstruction system of claim 1, wherein the acquisition module includes instructions to collect the position data including instructions to aggregate the position data in the electronic data store as the reporting vehicles travel over the roadway segment and communicate the position data to a remote device that includes the acquisition module, and
wherein the acquisition module includes instructions to collect the position data including instructions to receive the position data in the remote device as a plurality of communications including respective portions of the position data and locations of a respective ones of the reporting vehicles.

3. The lane obstruction system of claim 1, wherein the obstruction module includes instructions to analyze the position data including instructions to identify correlations across different vehicles represented in the position data with obstruction patterns that are indicative of different types of lane obstructions, and
wherein the position data includes one or more of positions within the roadway segment relative to the reporting vehicles of the surrounding vehicles, GPS locations of the reporting vehicles, and speeds of the surrounding vehicles and the reporting vehicles.

4. The lane obstruction system of claim 1, wherein the obstruction module includes instructions to determine the position data indicates the lane obstruction including instructions to identify an obstruction pattern in the position data that corresponds with paths for a threshold number of vehicles.

5. The lane obstruction system of claim 1, wherein the obstruction pattern is one of a plurality of obstruction patterns representing obstructions blocking a lane, blocking multiple lanes, blocking part of a lane, and causing braking by vehicles in a lane.

6. The lane obstruction system of claim 1, wherein the obstruction module includes instructions to provide the signal including instructions to:
query a location service to identify the oncoming vehicles that are approaching the road segment including the lane obstruction, and
communicate the signal as a warning about the lane obstruction to the oncoming vehicles.

7. The lane obstruction system of claim 1, wherein the acquisition module includes instructions to collect the position data including instructions to:
acquire, in respective ones of the reporting vehicles, sensor data from at least one sensor of respective ones of the reporting vehicles;
analyze, in the respective ones of the reporting vehicles, the sensor data to identify the surrounding vehicles including relative locations of the surrounding vehicles; and
communicate, from the respective ones of the reporting vehicles, an electronic data structure that includes the relative locations to a remote device.

8. The lane obstruction system of claim 1, wherein the position data includes identifiers of lane changes between lanes of the roadway segment for the reporting vehicles and the surrounding vehicles,
wherein the position data includes paths of the surrounding vehicles and the reporting vehicles along the roadway segment including at least lanes and associated locations within lanes, and wherein respective ones of the surrounding vehicles are observed by respective ones of the reporting vehicles.

9. A non-transitory computer-readable medium for identifying lane obstructions and including instructions that when executed by one or more processors cause the one or more processors to:
collect, in an electronic data store, position data of surrounding vehicles observed by reporting vehicles that travel over a roadway segment;
analyze the position data to identify whether observed positions correlate with an obstruction pattern that is indicative of a lane obstruction in at least one lane of the roadway segment; and
in response to determining the position data indicates the lane obstruction, provide a signal identifying the lane obstruction to oncoming vehicles of the roadway segment.

10. The non-transitory computer-readable medium of claim 9, wherein the instructions to collect the position data include instructions to aggregate the position data in the electronic data store as the reporting vehicles travel over the roadway segment and communicate the position data to a remote device, and
wherein the instructions to collect the position data include instructions to receive the position data in the remote device as a plurality of communications including respective portions of the position data and locations of a respective ones of the reporting vehicles.

11. The non-transitory computer-readable medium of claim 9, wherein the instructions to analyze the position data include instructions to identify correlations across different vehicles represented in the position data with obstruction patterns that are indicative of different types of lane obstructions, and wherein the position data includes one or more of positions within the roadway segment relative to the reporting vehicles of the surrounding vehicles, GPS locations of the reporting vehicles, and speeds of the surrounding vehicles and the reporting vehicles.

12. The non-transitory computer-readable medium of claim 9, wherein the instructions to determine the position data indicates the lane obstruction include instructions to identify an obstruction pattern in the position data that corresponds with paths for a threshold number of vehicles.

13. The non-transitory computer-readable medium of claim 9, wherein the obstruction pattern is one of a plurality of obstruction patterns representing obstructions blocking a lane, blocking multiple lanes, blocking part of a lane, and causing braking by vehicles in a lane.

14. A method for identifying lane obstructions, the method comprising:
   collecting, in an electronic data store, position data of surrounding vehicles observed by reporting vehicles that travel over a roadway segment;
   analyzing the position data to identify whether observed positions correlate with an obstruction pattern that is indicative of a lane obstruction in at least one lane of the roadway segment; and
   in response to determining the position data indicates the lane obstruction, providing a signal identifying the lane obstruction to oncoming vehicles of the roadway segment.

15. The method of claim 14, wherein collecting the position data includes aggregating the position data in the electronic data store as the reporting vehicles travel over the roadway segment and communicate the position data to a remote device that includes the electronic data store, and
   wherein collecting the position data includes receiving the position data in the remote device as a plurality of communications including respective portions of the position data and locations of a respective ones of the reporting vehicles.

16. The method of claim 14, wherein analyzing the position data includes identifying correlations across different vehicles represented in the position data with obstruction patterns that are indicative of different types of lane obstructions, and
   wherein the position data includes one or more of positions within the roadway segment relative to the reporting vehicles of the surrounding vehicles, GPS locations of the reporting vehicles, and speeds of the surrounding vehicles and the reporting vehicles.

17. The method of claim 14, wherein determining the position data indicates the lane obstruction includes identifying an obstruction pattern in the position data that corresponds with paths for a threshold number of vehicles, and
   wherein the obstruction pattern is one of a plurality of obstruction patterns representing obstructions blocking a lane, blocking multiple lanes, blocking part of a lane, and causing braking by vehicles in a lane.

18. The method of claim 14, wherein providing the signal includes:
   querying a location service to identify the oncoming vehicles that are approaching the road segment including the lane obstruction, and
   communicating the signal as a warning about the lane obstruction to the oncoming vehicles.

19. The method of claim 14, wherein collecting the position data includes:
   acquiring, in respective ones of the reporting vehicles, sensor data from at least one sensor of respective ones of the reporting vehicles;
   analyzing, in the respective ones of the reporting vehicles, the sensor data to identify the surrounding vehicles including relative locations of the surrounding vehicles; and
   communicating, from the respective ones of the reporting vehicles, an electronic data structure that includes the relative locations to a remote device.

20. The method of claim 19, wherein the position data includes identifiers of lane changes between lanes of the roadway segment for the reporting vehicles and the surrounding vehicles,
   wherein the position data includes paths of the surrounding vehicles and the reporting vehicles along the roadway segment including at least lanes and associated locations within lanes, and wherein respective ones of the surrounding vehicles are observed by respective ones of the reporting vehicles.

* * * * *